July 7, 1931.   G. V. CURTIS   1,812,934
UNIVERSAL JOINT
Filed Aug. 11, 1930

INVENTOR,
George V. Curtis,
BY
Harry M. Bowen.
ATTORNEY.

Patented July 7, 1931

1,812,934

UNITED STATES PATENT OFFICE

GEORGE V. CURTIS, OF WEST SPRINGFIELD, MASSACHUSETTS

UNIVERSAL JOINT

Application filed August 11, 1930. Serial No. 474,343.

My invention relates to improvements in universal joints such as are used as connecting members between a driving and a driven shaft which are disposed at an angle, in relation to each other.

An object of my invention is to provide a universal joint which will be strong, durable and conveniently assembled and taken apart.

A further object of my invention is to provide a universal joint which is very simple and economical of construction. I attain this object by using a combination of stock parts which require a minimum of machine operations and time in assembling, as will be fully described in the following specification.

These objects, and others which will appear in the description and drawings, I accomplish with the device herein described.

A preferred form of my invention is illustrated in the accompanying drawings, in which.

Referring to the drawings in detail, in which like numerals refer to like parts throughout.

Figure 1:
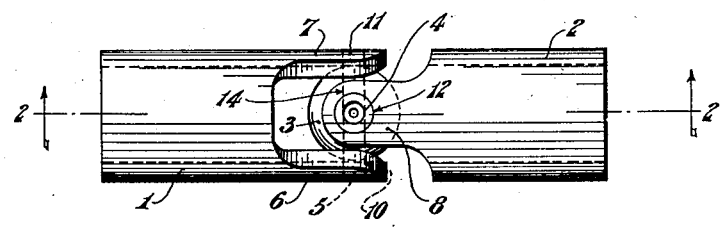
Fig. 1 is an elevational view of an assembled universal joint element.
Figure 2:
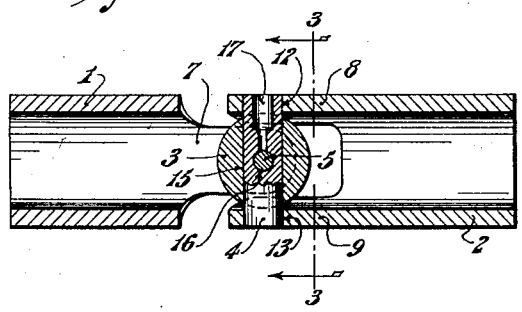
Fig. 2 is a longitudinal sectional view taken on line 2—2 of Fig. 1.
Figure 3:
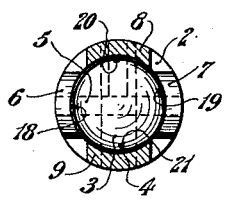
Fig. 3 is a cross sectional view taken on the line 3—3 of Fig. 2.

The universal joint is made up of five parts, comprising the coupling heads 1 and 2, the pivotal bearing sphere or ball 3, and the connecting pins 4 and 5. The coupling heads 1 and 2 are made of tubular steel stock, and an end of each is milled, as shown, to form the forked members 6, 7, 8, and 9. Holes 10, 11, 12, and 13 are drilled in the fork members 6, 7, 8 and 9 respectively, the holes 12 and 13 being larger than the holes 10 and 11. The holes, 14 and 15, are drilled in the steel ball 3 at right angles to each other, and corresponding in size with the holes 10 and 11, and 12 and 13, respectively. The pin 4 has a hole 16 drilled therein at right angles to its axis, of a slightly larger diameter than the pin 5, and also a hole 17 drilled from an end of the pin 4 longitudinally to meet the hole 16, the hole 17 being for lubrication purposes.

In assembling the parts, the ball 3 is inserted between the forks 8 and 9 with the holes 12 and 13 aligned with the hole 15, and the pin 4 inserted in the aligned holes, the larger pin 4 being so constructed as to form a running or turning fit in the holes 12 and 13 and a driving or press fit in the spherical ball 3. The forks 6 and 7 are then placed over the ball 3 with the holes 10, 11, 14, and 16 in alignment, and the pin 5 driven into place, said pin having a press fit in the forks 6 and 7 and a running fit in the ball 3 and pin 4.

To take apart the joint, the pin 5 is first driven out and then the pin 4. An important feature of my invention is the natural contour of the inner surface or walls of the tubular members 1 and 2, which forms the bearings 18, 19, 20, and 21, of the forks 6, 7, 8 and 9, respectively. These bearings rest on the curved surface of the spherical ball 3, without the necessity of any machine work on either the forks or ball. This is a feature which materially lessens the cost of construction.

It will be seen that my invention provides a practical, efficient universal joint with a minimum amount of production cost.

What I claim is:

1. A universal joint comprising a spherical pivot member, pins through the member and arranged relatively at right angles to each other with one pin passing through the other, said pins extending through and beyond the outer surface of said spherical pivot member, and tubular forked coupling heads pivoted on the projecting ends of said pins, the curvature of the inner surfaces of the projecting ends corresponding with the curvature of the spherical pivot member.

2. In combination, a spherical pivot ball, tubular coupling heads having forked-shaped ends whose inner surfaces bear on the surface of said ball, and two pins inserted through the forks into the ball, said pins being held in place by a tight fit as by riveting, in either the ball or fork, the inner curved surfaces of the forked ends being the same as the curved surface of the ball.

3. A universal joint construction comprising, in combination, two tubular end members, each having forked ends and each having curved inner surfaces, a spherical ball located between the forked ends, the curved surface of the ball engaging the inner curved surfaces of the forked ends, and pivot pins connecting the forked ends and the said ball.

GEORGE V. CURTIS.